United States Patent
Shope

(10) Patent No.: US 8,136,288 B1
(45) Date of Patent: Mar. 20, 2012

(54) FIELD CONVERSION DECOYS

(76) Inventor: John Edward Shope, Huron, MI (US)

( * ) Notice: Subject to any disclaimer, the term of this patent is extended or adjusted under 35 U.S.C. 154(b) by 642 days.

(21) Appl. No.: 12/228,939

(22) Filed: Aug. 18, 2008

(51) Int. Cl.
*A01M 31/06* (2006.01)

(52) U.S. Cl. .................................... 43/3; 43/2

(58) Field of Classification Search .............. 43/1–3; D22/125; 248/156, 530, 545, 353
See application file for complete search history.

(56) References Cited

U.S. PATENT DOCUMENTS

| | | | | |
|---|---|---|---|---|
| 230,600 A | * | 8/1880 | Allen | 43/3 |
| 1,299,896 A | * | 4/1919 | Anderson | 43/3 |
| 5,461,816 A | * | 10/1995 | Gazalski | 43/3 |
| D365,136 S | * | 12/1995 | Shaver et al. | D22/125 |
| 6,543,176 B1 | * | 4/2003 | McGhghy | 43/3 |
| 7,124,532 B1 | * | 10/2006 | Ellis | 43/2 |
| 7,568,305 B2 | * | 8/2009 | Fanfelle | 43/3 |
| 2005/0268522 A1 | * | 12/2005 | Foster et al. | 43/3 |

* cited by examiner

*Primary Examiner* — Kimberly Smith
*Assistant Examiner* — Danielle Clerkley
(74) *Attorney, Agent, or Firm* — Robert L. McKellar; McKellar IP Law, PLLC

(57) ABSTRACT

A mounting device that is used with floating waterfowl decoys to enable the floating decoys to be converted for use in a dry field. This is accomplished by using a mounting platform that is equipped with flexible attaching means that loop over the extended part of the keel on a floating waterfowl decoy.

5 Claims, 2 Drawing Sheets

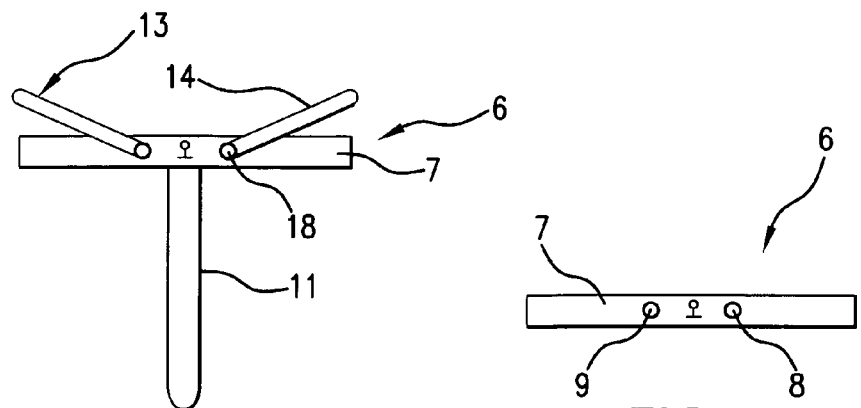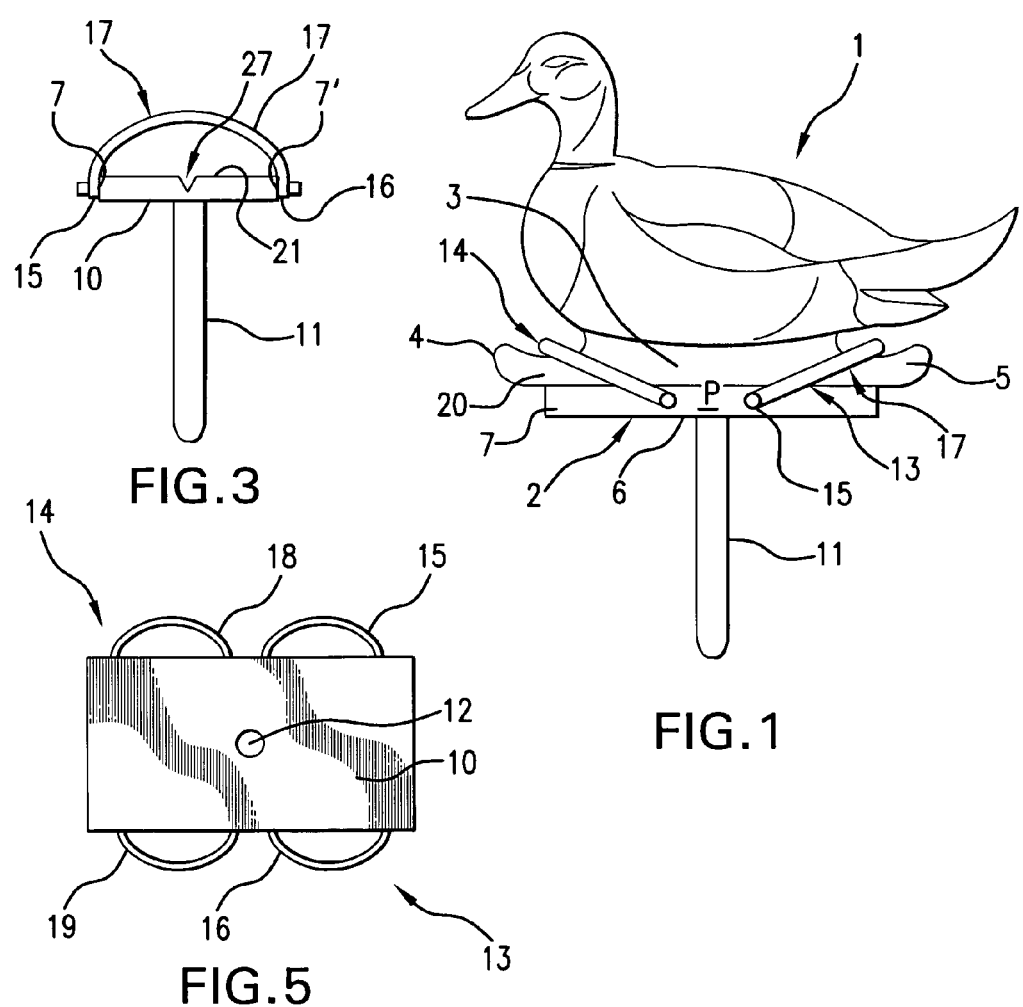

FIELD CONVERSION DECOYS

The invention claimed and disclosed herein deals with devices that are useful for converting floating waterfowl decoys to field waterfowl decoys without destroying the floating decoy capability.

Thus, what is disclosed is a mounting device that is used with floating waterfowl decoys to enable the floating decoys to be converted for use in a dry field. This is accomplished by using a mounting platform that is equipped with flexible attaching means that loop over the extended part of the keel on a floating waterfowl decoy.

Also disclosed is the combination of a floating duck decoy and the mounting device along with kits that are the mounting devices for the decoys.

BACKGROUND OF THE INVENTION

The inventor herein is unaware of any prior art devices analogous to the devices of this invention.

BRIEF DESCRIPTION OF THE DRAWINGS

FIG. 1 is a full side view of a floating duck decoy mounted to a mounting device of this invention.

FIG. 2 is a full side view of a mounting device of this invention.

FIG. 3 is a full end view of a mounting device of this invention.

FIG. 4 is a full side view of the flat panel without the loops and the detachable rod.

FIG. 5 is a full bottom view of the flat panel without the detachable rod.

THE INVENTION

Figure 6:
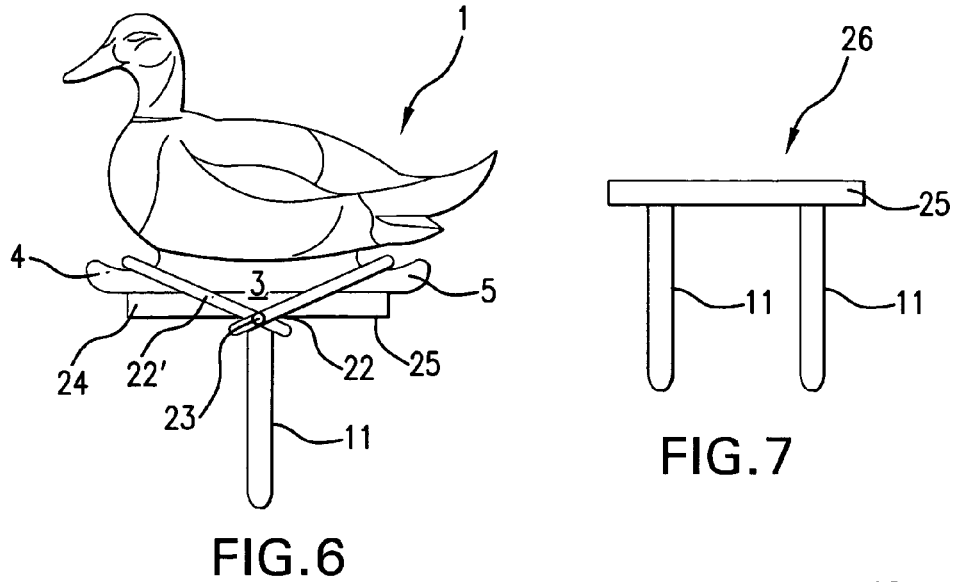
FIG. 6 is a full side view of a second embodiment of this invention.

Thus, in a first embodiment of this invention there is disclosed in this specification a field conversion decoy for waterfowl hunting, said field conversion decoy comprising in combination a floatable waterfowl decoy having a keel, wherein the keel has a front end and a back end and a mounting apparatus.

The mounting apparatus comprises a flat panel and attachment means. The flat panel has a predetermined size and thickness. The flat panel has two side edges, each side edge has a center point, a bottom, a top, and the bottom has a centered first opening therein. The centered first opening has a detachable rod inserted therein.

The side edges each have two openings adjoining each other and near the center point thereof to provide a forward pair of openings, one on each side edge of the flat panel and a rearward pair of openings, one on each side edge of the flat panel.

There are two flexible attachment means each having a first end and a second end, one said attachment means has the first end fixed in one side edge forward opening and the second end fixed in the opposite side edge forward opening forming a loop over the front end of the keel.

The remaining attachment means has the first end fixed in one side edge rearward opening and the second end fixed in the opposite side edge rearward opening to form a loop over the back end of the keel.

A second embodiment of this invention is the mounting apparatus for converting floating waterfowl decoys to field waterfowl decoys comprising a flat panel having a predetermined size and thickness, wherein the flat panel has two side edges, each side edge having a center point, a bottom, and a top. In addition, the bottom has a centered first opening in it. The centered first opening has a detachable rod inserted in it.

The side edges of the flat panel each have two openings adjoining each other and near the center point to provide a forward pair of openings, one on each side edge of the flat panel and a rearward pair of openings, one on each side edge of the flat panel.

There are two flexible attachment means each having a first end and a second end, one said attachment means having the first end fixed in one side edge forward opening and the second end fixed in the opposite side edge forward opening forming a loop over the front end of the keel. The remaining attachment means has the first end fixed in one side edge rearward opening and the second end fixed in the opposite side edge rearward opening to form a loop over the back end of the keel.

There is a third embodiment of this invention that is a field conversion decoy for waterfowl hunting, wherein the field conversion decoy comprises in combination a floatable waterfowl decoy having a keel, the keel having a front end and a back end.

There is a mounting apparatus comprising a flat panel having a predetermined size and thickness, a bottom, and a top. The bottom has a centered first opening in it. The centered first opening has a detachable rod inserted in it. There are two separable flexible attachment means for attaching a floating decoy to the mounting apparatus.

In another embodiment, there is a mounting apparatus for converting floating waterfowl decoys to field waterfowl decoys comprising a flat panel having a predetermined size and thickness, a bottom, and a top. The bottom has a centered first opening in it and the centered first opening has a detachable rod inserted in it. There are two separable flexible attachment means for attaching a waterfowl decoy to the mounting apparatus.

In yet another embodiment, there is a field conversion decoy for waterfowl hunting, said field conversion decoy comprising in combination a floatable waterfowl decoy having a keel, the keel having a front end and a back end.

In addition, there is a mounting apparatus comprising a flat panel having a predetermined size and thickness. The flat panel has two side edges, each side edge has a center point, a bottom, and a top. The bottom has two centered first openings in it and each centered first opening has a detachable rod inserted in it.

The side edges each have two openings adjoining each other and near the center point to provide a forward pair of openings, one on each side edge of the flat panel and a rearward pair of openings, one on each side edge of the flat panel.

There are two flexible attachment means each having a first end and a second end, one said attachment means having the first end fixed in one side edge forward opening and the second end fixed in the opposite side edge forward opening forming a loop over the front end of the keel.

The remaining attachment means has the first end fixed in one side edge rearward opening and the second end fixed in the opposite side edge rearward opening to form a loop over the back end of the keel.

Going to another embodiment of this invention, there is a mounting apparatus for converting floating waterfowl decoys to field waterfowl decoys comprising a flat panel having a predetermined size and thickness. The flat panel has two side edges, each side edge having a center point, a bottom, and a top, said bottom having two centered first openings therein. Each centered first opening has a detachable rod inserted in it.

The side edges each have two openings adjoining each other and near the center point thereof to provide a forward pair of openings, one on each side edge of the flat panel and a rearward pair of openings, one on each side edge of the flat panel.

There are two flexible attachment means each having a first end and a second end, wherein one of the attachment means has the first end fixed in one side edge forward opening and the second end fixed in the opposite side edge forward opening forming a loop over the front end of the keel.

The remaining attachment means has the first end fixed in one side edge rearward opening and the second end fixed in the opposite side edge rearward opening to form a loop over the back end of the keel.

Still another embodiment of this invention is a field conversion decoy for waterfowl hunting wherein the field conversion decoy comprises in combination a floatable waterfowl decoy having a keel. The keel has a front end and a back end.

There is a mounting apparatus comprising a flat panel having a predetermined size and thickness, a bottom, and a top. The bottom has two centered first openings in it, each centered first opening having a detachable rod inserted in it.

There are two separable flexible attachment means for attaching the decoy to the mounting apparatus.

Going to another embodiment there is a kit for converting a floating duck decoy to a field decoy. The kit comprises a flat panel having a predetermined size and thickness, said flat panel having two side edges, each side edge having a center point, a bottom, and a top, said bottom having at least one centered first opening in it.

The side edges each have two openings adjoining each other and near the center point thereof to provide a forward pair of openings, one on each side edge of the flat panel and a rearward pair of openings, one on each side edge of the flat panel.

There is at least one detachable rod and two flexible attachment means each said attachment means having a first end and a second end, one said attachment means having the first end fixed in one side edge forward opening and the second end fixed in the opposite side edge forward opening.

The remaining attachment means has the first end fixed in one side edge rearward opening and the second end fixed in the opposite side edge rearward opening.

Finally, there is yet another embodiment of this invention which is a kit for a field conversion decoy for waterfowl hunting, said kit comprising in combination a mounting apparatus comprising a flat panel having a predetermined size and thickness, a bottom, and a top. The bottom has a centered first opening in it.

There is a detachable rod inserted in the centered first opening and two separable flexible attachment means for attaching the decoy to the mounting apparatus.

DETAILED DESCRIPTION OF THE INVENTION

Turning now to FIG. 1 which is a full side view of a floating duck decoy 1 mounted to a mounting device 2 of this invention there is shown a floating duck decoy 1, having a keel 3, wherein the keel 3 has a front end 4 and a back end 5.

Shown in FIG. 2 is a full side view of a mounting device 2 of this invention and FIG. 3 is a full end view of a device of this invention wherein there is shown a flat panel 6 having a predetermined size and thickness. The size and thickness of the flat panel is determined by the size of the decoy that is to be mounted thereon. Thus, duck decoys will require a smaller flat panel 6 than a goose decoy.

Nominally, the duck decoy flat panel 6 will range in size from about 3 to six inches long by about 2 inches wide, an about ½ inch thick, wherein the flat panel 6 for a goose decoy will range about 6 to 10 inches long by about 3 inches wide and about ½ inch thick.

The flat panel 6 is painted or dyed to imitate the bottom of the decoy being used thereon, for example, the common colors are white, gray and black.

The flat panel 6 has two side edges 7 and 7'. Each side edge has a center point P for purposes of orientation and clarification of the device with regard to the placement of openings 8 in the rear portion, and the openings 9 in the forward portion.

The bottom 10 of the flat panel 6 has a centered opening 12 in it for purposes of inserting a detachable rod 11 therein. It should be noted that it is not essential that the opening 12 be exactly centered, but in order to balance the decoy, it should be near the center of the flat panel 6.

The detachable rod 11 is colored to imitate the legs of the various waterfowl, for example, black for geese, yellow for certain ducks, green for certain other ducks and orange for yet other species of ducks.

The detachability aspect of the detachable rod 11 allows for a quick change to accommodate the various species of ducks and geese that are decoyed in to the decoys.

Then, as set forth Supra, each of the side edges 7 and 7' have openings 8 in the rear portion and openings 9 in the forward portion.

The holes 8 and 9 are thus paired in the rearward portion and in the forward portion of the side edges 7 and 7' of the flat panel 6 in order to accommodate flexible attachment means 13 and 14. The first end 15 of the flexible attachment means 13 is inserted into one side edge rearward opening 8 and the second end 16 is inserted into the opposite side edge opening 8 to complete a loop 17 over the back keel 5 and, the first end 18 of the other flexible attachment 14 is inserted into one side edge forward opening 9 and the second end 19 is inserted into the opposite side edge opening 9 to complete a second loop 20 over the front keel 4.

The loops 17 and 20 are securely fastened into the openings 8 and 9 to ensure that they securely hold the decoy 1 on the flat panel 6. It is contemplated within the scope of this invention to provide a recess or groove 27 in the top surface 21 of the flat panel 6 so that the keel 3 can be more securely held in place.

By "flexible" it is meant that the loops 17 and 20 have the capability to be drawn or stretched over the ends of the keel 3. For example, an elastomeric material may be used that can be stretched and upon placement on the keel 3, will provide a secure hold on the keel 3. Yet, the flexibility will allow the elastomeric material to be stretched to remove it from the keel 3. An example of the elastomeric material would be rubber O-rings that are commercially available. Also, rubber bands would be an example. It is also contemplated within the scope of this invention to use springs to accomplish the same result. It is also contemplated within the scope of this invention to utilize one loop as a non-stretchable material and the other loop to be a stretchable material.

Turning now to FIG. 6, there is shown another embodiment of this invention which is a floatable duck decoy that is mounted on a mounting apparatus wherein the elastomeric material is rubber O-rings 22 and 22' that are applied around the top 23 of the rod 11 and anchored around the front end 4 and the back end 5 of the keel 3 of the decoy 1 without the necessity of having the ends of the elastomeric material anchored in openings in the sides 24 and 24' (not shown) of the flat panel 25.

Figure 7:
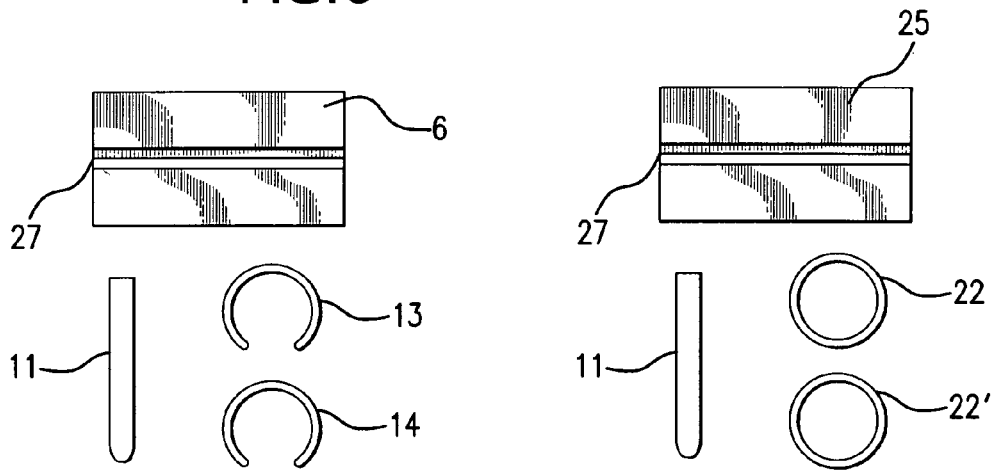
FIG. 7 is a full side view of another mounting apparatus of this invention using two support rods.

FIG. 7 is a full side view of a mounting apparatus 26 of this invention using two rods 11 as support.

Figures 8, 9:
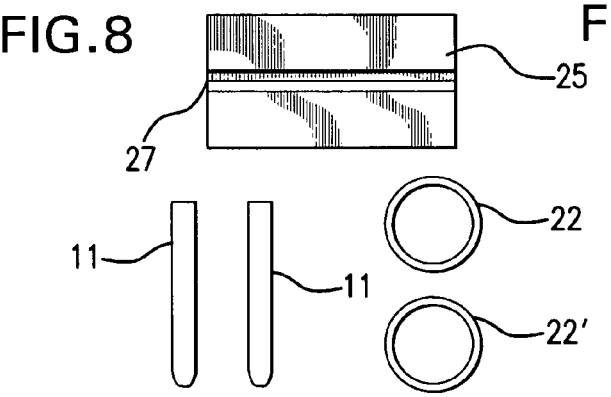
FIG. 8 shows the components of the kit for the device shown in FIG. 1.
FIG. 9 shows the components of the kit for the device as shown in FIG. 6.

FIG. 8 shows the components of a kit for the embodiment using attachable elastomeric materials for attaching the decoy to the mounting apparatus 2.

Figure 10:
FIG. 10 shows the components of the kit for the device as shown in FIG. 7 plus two elastomeric attachments means.

FIG. 9 shows the components of a kit for the embodiment of FIG. 6 and FIG. 10 shows the components of a kit for the double rod embodiment shown in FIG. 7, wherein in FIG. 8, there is shown the flat panel 6, with the channel or groove 27, the support rod 11 and the elastomeric attaching means 13 and 14, while in FIG. 9, there is shown the flat panel 25, the support rod 11 and the flexible attachment means 22 and 22'.

Shown in FIG. 10 is the mounting apparatus 26, shown in FIG. 7 which comprises the flat panel 25, with the groove 27, the flexible attachments means 22 and 22', and two support rods 11.

The mounting devices of this invention can be manufactured from any water resistant material, such as wood, plastics, metals, such as aluminum, and the like. It is preferred to manufacture the devices of this invention from plastics, because they have the integrity to withstand continuous use and can be manufactured very inexpensively.

The inventive devices herein are used to convert floating decoys having a keel, to use in the field without having to remove or destroy the floating decoy keel. Using floating decoys in a field set up is not desirable because the keels will not allow the decoys to remain upright in the field.

Thus, by this means, a hunter will need to buy only floating decoys, and will not have to buy another set which are field decoys.

What is claimed is:

1. A field conversion decoy for waterfowl hunting, said field conversion decoy comprising in combination:
   A. a floatable waterfowl decoy having a keel, said keel having a front end and a back end;
   B. a mounting apparatus comprising:
      a flat panel having a predetermined size and thickness, said flat panel having two side edges, each side edge having a center point, a bottom, and a top, said bottom having a centered first opening therein, said centered first opening having
   C. a detachable rod inserted therein;
      said side edges each having two openings adjoining each other and near the center point thereof to provide a forward pair of openings, one on each side edge of the flat panel and a rearward pair of openings, one on each side edge of the flat panel;
   D. two flexible attachment means each having a first end and a second end, one said attachment means having the first end fixed in one side edge forward opening and the second end fixed in the opposite side edge forward opening forming a loop over the front end of the keel;
      the remaining attachment means having the first end fixed in one side edge rearward opening and the second end fixed in the opposite side edge rearward opening to form a loop over the back end of the keel.

2. A mounting apparatus for converting floating waterfowl decoys, having a keel, to field waterfowl decoys comprising:
   A. a flat panel having a predetermined size and thickness, said flat panel having two side edges, each side edge having a center point, a bottom, and a top, said bottom having a centered first opening therein, said centered first opening having
   B. a detachable rod inserted therein;
      said side edges each having two openings adjoining each other and near the center point thereof to provide a forward pair of openings, one on each side edge of the flat panel and a rearward pair of openings, one on each side edge of the flat panel;
   C. two flexible attachment means each having a first end and a second end, one said attachment means having the first end fixed in one side edge forward opening and the second end fixed in the opposite side edge forward opening forming a loop over the front end of the keel;
      the remaining attachment means having the first end fixed in one side edge rearward opening and the second end fixed in the opposite side edge rearward opening to form a loop over the back end of the keel.

3. A field conversion decoy for waterfowl hunting, said field conversion decoy comprising in combination:
   A. a floatable waterfowl decoy having a keel, said keel having a front end and a back end;
   B. a mounting apparatus comprising:
      a flat panel having a predetermined size and thickness, said flat panel having two side edges, each side edge having a center point, a bottom, and a top, said bottom having two centered first openings therein, each centered first opening each having
   C. a detachable rod inserted therein;
      said side edges each having two openings adjoining each other and near the center point thereof to provide a forward pair of openings, one on each side edge of the flat panel and a rearward pair of openings, one on each side edge of the flat panel;
   D. two flexible attachment means each having a first end and a second end, one said attachment means having the first end fixed in one side edge forward opening and the second end fixed in the opposite side edge forward opening forming a loop over the front end of the keel;
      the remaining attachment means having the first end fixed in one side edge rearward opening and the second end fixed in the opposite side edge rearward opening to form a loop over the back end of the keel.

4. A mounting apparatus for converting floating waterfowl decoys, having a keel, to field waterfowl decoys comprising:
   A. a flat panel having a predetermined size and thickness, said flat panel having two side edges, each side edge having a center point, a bottom, and a top, said bottom having two centered first openings therein, each centered first opening having
   B. a detachable rod inserted therein;
      said side edges each having two openings adjoining each other and near the center point thereof to provide a forward pair of openings, one on each side edge of the flat panel and a rearward pair of openings, one on each side edge of the flat panel;
   C. two flexible attachment means each having a first end and a second end, one said attachment means having the first end fixed in one side edge forward opening and the second end fixed in the opposite side edge forward opening forming a loop over the front end of the keel;
      the remaining attachment means having the first end fixed in one side edge rearward opening and the second end fixed in the opposite side edge rearward opening to form a loop over the back end of the keel.

5. A kit for converting a floating duck decoy to a field decoy, said kit comprising:

A. a flat panel having a predetermined size and thickness, said flat panel having two side edges, each side edge having a center point, a bottom, and a top, said bottom having at least one centered first opening therein;

said side edges each having two openings adjoining each other and near the center point thereof to provide a forward pair of openings, one on each side edge of the flat panel and a rearward pair of openings, one on each side edge of the flat panel;

B. at least one detachable rod;

C. two flexible attachment means each having a first end and a second end, one said attachment means having the first end fixed in one side edge forward opening and the second end fixed in the opposite side edge forward opening;

the remaining attachment means having the first end fixed in one side edge rearward opening and the second end fixed in the opposite side edge rearward opening.

\* \* \* \* \*